United States Patent [19]

Atencio

[11] 4,207,015
[45] Jun. 10, 1980

[54] SELF-STABILIZED HYDROMOTIVE ASSEMBLY

[76] Inventor: Francisco J. G. Atencio, Estafeta Dr. Garcia, Diamante Entre Rios, Argentina

[21] Appl. No.: 880,635

[22] Filed: Feb. 23, 1978

[51] Int. Cl.² .............................................. E02B 9/00
[52] U.S. Cl. ........................................ 405/78; 290/52; 405/75
[58] Field of Search ................ 61/19, 20, 30; 290/52, 290/53, 42; 417/234; 405/75, 76, 77, 78

[56] References Cited

U.S. PATENT DOCUMENTS

| | | | |
|---|---|---|---|
| 1,730,578 | 10/1929 | Lawaczeck | 61/19 X |
| 2,783,392 | 2/1957 | Corbiere | 405/78 |
| 2,945,960 | 7/1960 | Obrist | 61/19 X |
| 4,073,146 | 2/1978 | Atencio | 405/78 |
| 4,078,388 | 3/1978 | Atencio | 61/19 |

FOREIGN PATENT DOCUMENTS 1123466  6/1956  France ........................... 417/234

Primary Examiner—Dennis L. Taylor
Attorney, Agent, or Firm—Emory L. Groff, Jr.

[57] ABSTRACT

Transportable self-stabilized hydromotive assembly for a fluid storing dam for purposes of energy production; being engineered with a water flow circulation path having a very restricted longitude, and an electric generator having a rotor with a great moment of inertia; then introducing a dynamically self-stabilized performance into the connected electrical networks.

Means are also provided for purposes of: starting, synchronizing, keep running, and stopping the turbine-generator set; and for introducing a balanced upwardly lifting pull into the structural body of said hydromotive assembly when positioned in submerged status for purposes of energy production, or for transportation procedures.

10 Claims, 2 Drawing Figures

SELF-STABILIZED HYDROMOTIVE ASSEMBLY

BACKGROUND OF THE INVENTION

The present invention relates to hydroelectric assemblies for hydroelectric plants, and more particularly, to a self-stabilized hydromotive assembly and, eventually, to a water storing dam adapted to receive it.

The aim of these hydromotive assemblies, positioned in coincidence with the open ends of the water flow circulations paths engineered through the main body of these dams; is to convert the inherent gravitational energy of the mass of water stored in the reservoirs defined behind said dams, into electric energy. The efficiency of this conversion is particularly imperative in horizontally arranged hydroelectric machines.

It is an aim of the present invention, to introduce the principle of the turbine-generator set arrangement concept engineered around a substantially horizontally positioned axis; or around a slightly slantingly positioned axis.

This arrangement, although having a plurality of technical advantages as it will be seen later; has not been popularized up today because of a plurality of deterring questions which are expected to be solved by means of the teachings introduced by the present invention.

One of these deterring questions concerns the up until today most popularized hydroelectric set engineered around the substantially positioned vertical axis concept, which imposes mechanical engineering principles upon hydraulic engineering ones.

It is known that in a hydroelectric station, the highest operational efficiency is attained when the engineered passages which directs the water flow through the dam, are shaped like rectilinear structural embodiments. If these passages have bends, scrolls, elbow draft diffusers, etc; the efficiency of the energy conversion is reduced because of the increased friction between the water flowing along them, and the inner surfaces thereof; thus reducing the amount of energy output of the hydroelectric station engineered on said dam.

Furthermore, the erection costs of these civil engineered structures having so complicated water passages, is very expensive and puts a great financial overburden on the respective enterprises. There are also, great constructive delay involvements on these engineered projects before putting them in the commissioned operative status.

Because of the introduction of the horizontal axis engineered concept, all these deterring factors are expected to be passed away.

Another aim of the present invention, concerns with the industrial modulated principles involved in the transportable self-stabilized hydroelectric assembly concept. By means of this principle, industrial engineered concepts are expected to be introduced in massive terms, into a technology up today mostly dominated by engineered craftsmanship principles.

This is so, because the best hydroelectric station engineered project must be designed under standardized concepts and erected with mass produced industrial components, thus saving erection time and financial costs.

Furthermore, under operational performance, the concerned hydroelectric station must not have shutdown delays for cause of maintenance procedures on generators and turbines.

It must have also, a very low investment figure realized in terms of money invested per kilowatt of electric power installed capacity.

Additionally, the erection time schedule required to install turbines and generators and put them in operation, must be the shortest possible one.

All these objectives are claimed to be made possible by means of the present invention.

All these considerations, which not only take into account hydroelectric station hydraulic efficiency and construction civil engineering techniques, but also financial requirements; have not been fulfilled up until today because the technology in horizontal axis engineered machines for hydroelectric generation had not been advanced enough in technical efficient terms in the last years, to keep pace with the most massive and spectacular nuclear electric generation development.

Consequently, less efficient design concepts and erection methods are used today, although they are very expensive and produce very large engineered structures, requiring great time delays to commission them.

Thus, it is an aim of the present invention to enable the provision of optimum erection methods by providing means for: manipulating, positioning, and mounting transportable hydroelectric equipment with relative ease and in a very short time interval, in spite of their cumbersome sizes and very heavy weights.

An additional aim of the present invention, has been to provide a novel engineering approach in technology design, whereby it is possible to increase the erection speed of a known hydroelectric project, thus minimizing the time delays to be supported until the commissioning date.

Because of their inherent efficiency and very modern technical features, and cost reduced manufactured bodies-components being individually lighter in weight by reasons of the advantages involved around the substantially horizontally engineered axis concept, expected to be massively introduced in the near future in hydroelectric equipments construction after the teachings of the present invention have been mastered; horizontal-axis hydroelectric sets having capsule mounted generators with Kaplan motive turbines or Deriaz motive turbines; and which today have been limited to very restricted practical applications on hydroelectric projects; will be progressively engineered to be installed in hydroelectric schemes having higher and higher hydraulic heads. In this way, the practical application field will be broadened, the actual engineered trends in hydroelectric construction will be flexibilized, and these useful types of machines will be progressively involved in this novel technique.

According to one aspect of the present invention, there is provided a transportable self-stabilized hydromotive assembly for an energy generation purpose, to be positioned against the structural body of a dam, and in functional coincidence with the water passing means embodied into the dam structure.

In the general arrangement, said hydromotive assembly has incorporated a water conduit in its structural body, defined by a lateral wall surrounding the motive turbine and having: a, generally shaped, annular first open end for water flow admission and a second open end for discharging the water entering the first open end, being circularly shaped in most cases.

Auxiliary means are available for purposes of water flow regulation, such as: movable vane distributors, movable bladed turbine runners, upstreamly positioned gates, downstreamly positioned gates, and the like; as is well known in the art.

This transportable hydromotive assembly also includes, defined in its structural body; a plurality of engineered buoyancy means of a volume at least sufficient to produce an upwardly lifting pull of a substantial numerical magnitude when said hydromotive assembly is positioned in submerged status for purposes of transportation procedures, or energy production.

These buoyancy means could be engineered as a plurality of watertight compartments, engineered around the generator's capsule and around the turbine conduit; which can be filled with fluid for sinking purposes or with gas for floatation purposes.

In this way, transportation procedures to the body of said dam or from the body of the dam, will be eased, and will be speeded. No heavy load strains will be introduced into the cranage facilities or other pulling means required to introduce these movable sequences into the body of said hydromotive assembly.

Furthermore, if a good distribution of these buoyancy means is engineered around the structural body of the hydromotive assembly; then, a good inherent stability will be introduced in the submerged status of said hydromotive assembly; and an additional second motivation of self static stability will be introduced, when said hydromotive assembly is moved for transportation procedures. As already said, these movable sequences are produced by means of: cranages facilities, movably sinkable and floatable pontoons, jacking arrangements, and the like; as is well known in the art.

The structural body of said transportable self-stabilized hydromotive assembly; incorporates also, a machine hall which includes all the necessary equipments for the full operational performance of said hydromotive assembly.

These means are listed as follows: turbine's governors, generator's controls, compressed air systems, lubrication systems, refrigeration systems, emergency energy sources, self propulsion for transportation procedures, incorporated switchyard and power transformation facilities, and the like.

In this way, a full operational and independent power packet will be available for purposes of being: manufactured at a plant, transported, and positioned at the dam site for purposes of electric power production.

This is the technical novelty involved around the concept explained in this invention entitled: Self-stabilized Hydromotive Assembly.

According to an even further aim of the present invention, a new concept in engineering design of hydroelectric stations, which flatly avoids the concreted structures of the machine hall and related powerhouse structures up until today incorporated at the body of the dam; is also provided.

Up until today, in the horizontal-axis disposition promoted by this invention; the capsule mounted generator of the bulb set has divided it into two sections: the mechanical section having the motive turbine, and the electrical section having the said generator.

Then, up until today, two access shafts were always necessary to be engineered in the machine hall and through the body of the dam if overall access to the machine during operation is required and specified.

Since the turbine runner and the electric generator are both horizontally connected by a shaft; then, these two bodies-components of the bulb set do not lie in the same vertical plane, as occurring in the vertical axis concept; thus making imperative the construction of said independent two shafts for erection purposes and access procedures.

This fact makes the machine hall engineered design in the horizontal axis engineered concept, more complicated that in the vertical axis concept; and led to the alternative design in which the generator is installed via the turbine runner shaft.

This simplification of the machine hall civil engineered structures, renders machinery installation and maintenance procedures, more complicated; particularly in large powered machines.

As a result, replacement of the generator components requires complete dismantling of the entire machine, giving very long outages.

With the introduction of our transportable self-stabilized hydromotive assembly concept, this deterring question is fully avoided because of the suppression of the expensive and difficult to build machine hall structure.

This basic technical fact provides a secondary and novel advantage which relates with maintenance procedures.

With the suppression of the machine hall concept; maintenance of motive turbines and generators is simplified too.

Machines which require important overhauls are instantly shifted away and replaced by operative ones arriving from the service center.

In this way, a unique service station is provided for the maintenance of a plurality of hydroelectric stations erected within a given watershed, thus revolutionizing maintenance concepts procedures followed up today in actual practices, provided by the present new technology.

According to an even further aim of the present invention, a horizontally positioned axis hydroelectric machine set is designed in such a way that the diametrical numerical magnitude of the generator's rotor, and the generator itself; is free to be engineered with a numerical magnitude substantially greater than the numerical diametrical magnitude of the turbine motive rotor. By means of this technical fact; an actually engineered connecting numerical parameter of only nearly: 1 to 1 (one to one); may be feasibly increased up to: 2 to 1 (two to one); in the generator's rotor/turbine's runner diametrical numerical comparison, made possible by this new proposed technology.

Because of this fact, the natural inertia of the generator's rotor measured in terms of: $lb-ft^2$, of their moment of inertia; will be capable to be engineered with a multiplied factor of: 10 to 1 (ten to one), and more; in comparison with the moment of inertia provided with the old technology; in the old designs having restricted diametrical engineered rotors.

This basic engineered achievement is made possible because of the technical features provided by our horizontal axis concept disposition; in which, being the capsulated electrical generator not surrounded by concreted structures and related machine hall and powerhouse water intakes conduits; then, a free diametrical design is permitted at the external magnitude of said generator's capsule and also, at their respective contained generator's stator and generator's rotor; which are now free to be designed around diameters up until today only found in the vertical axis engineered disposition concept.

In this way, technical advantages up until today only found in said vertical axis technology, are now available to be applied to the horizontal axis technology expected to be fully promoted by this invention.

This question is very imperative because up until today; horizontal axis machines have suffered by limitations on their electrical engineered features. As already said, the generator is installed into the upstreamly water intake positioned hub capsule.

Since for hydraulic and economic reasons (because of said surrounding concreted structures), said bulb capsule must be made as small as possible; then, the electrical output must be produced by a generator having a rotor of very restricted diameter. This reduces the natural inertia of the machine, requiring very carefully designed turbine water conveying inlets and intakes to avoid unacceptable power fluctuations arising from an irregular incoming water flow pattern. For small machines connected at large electrical networks, said fluctuations may be allowable; but not in large powered hydroelectric stations or relatively small electrical networks.

Because of the technical features involved around our invented transportable self-stabilized hydromotive assembly concept, this deterring situation is avoided by means of a twofold technical procedure.

These twofold technical resources are established as follows: firstly, by increasing the diameter of the generator's rotor as previously established. Secondly, by decreasing the longitudinal path of the water flow circulation conduit which conveys actuating waters into the turbine runner propeller.

In our particular horizontal axis engineered disposition, said longitudinal path may be feasibly reduced from: $8.\phi \ldots 6.\phi$; actually found in the vertical and horizontal axis technologies; down to: $3.\phi \ldots 2.\phi$, feasibles to be engineered in our new proposed technology; in which, $\phi$ represents the diametrical numerical parameter of the involved runner of the motive turbine.

Then, those twoway acquired technical advantages; provide a good stabilizing effect poured into the dynamic performance of our horizontal axis conceptual disposition. No more water flow fluctuations and water hammer hydraulic transient effects will be introduced into the incoming actuating masses of water which produce actuation upon the turbine runner, from one side.

From the other side, a good moment of inertia will be free to be engineered into the generator's rotor; thus adding a second motivation pointed to the objective of the intrinsic stabilization of the running machine.

Then, a machine having a twoway self-stabilization engineered design and conceptual development, will now be free to be manufactured to be installed for purposes of providing a very smooth performance in future hydroelectric developments; and also profitting of all the advantages which are feasible to be found in the horizontal axis conceptual disposition, to be engineered in the future in industrial massive terms.

This is the main objective expected to be reached by this invention entitled: Self-stabilized Hydromotive Assembly.

According to an even further aim of the present invention, a hydroelectric generator engineered concept is provided in which, the generator's rotor and generator's stator are both feasibly cooled without technical restrictions.

It is known that the output of a given hydroelectric machine rises accordingly to the square of the turbine runner diameter and with the 1.5 power of the hydraulic head. Due to the aforementioned restriction of the generator diameter, its length must be increased disproportionately with increasing turbine runner diameter and hydraulic head, making cooling more and more difficult.

While small capacity bulb turbine generators can be effectively air cooled, water cooling becomes necessary for very large units with outputs of more than: 60,000 kW. per machine.

With the closely-packed design disposition, this is difficult and expensive to accomplish.

Thus, up until today, all existing bulb turbine designs are limited to be engineered with turbine runners mostly having no more than 6.5 meters in diameter; and at hydraulic heads of no more than: 12 meters.

Heads in the range of: 30 meters and more; and individual power outputs in the range of: 100,000 kW. and more per machine, are technically impossible to be realized today.

However, with the teachings incorporated by the present invention, they are feasible to be engineered.

This technical fact is clearly understood when, we realize that in our horizontal axis particular conception; both, the generator's rotor and the generator's stator, having a great diametral numerical parameter; then, they are free to be engineered around the known technologies available today at the vertical axis disposition concept.

Then, the cooling of our horizontal axis generator will profit of the same technical resources available at the the cooling of actually engineered vertical axis generators having great individual outputs.

In this way, another deterring situation which up until today has restrained the development of the horizontal axis conceptual disposition, is again avoided.

According to an even further aim of the present invention, a hydroelectric generator horizontal axis concept is provided in which, mechanical bodies-components are all engineered around a solid structural arrangement.

Because of the above mentioned restrictions of the generator diameter, its length must be increased disproportionately with increasing turbine runner diameters and hydraulic head; and so the mechanical project spread along a very long axial structural arrangement. In this way, the force transmission path within a bulb turbine is very long.

For hydraulic reasons it is advantageous to arrange the runner of the turbine, with overhung bearings. Because of the horizontal position of the cantilever axis and the significant forces introduced by the own weight of the turbine runner, and the hydraulic forces induced into it by the actuating water flow, large bending moments are imposed on the bulb and thence via several long ribs through the water passages into the foundations at the body of the dam. The same fact, applies to the reaction moments from the generator stator which must be designed, in case of short circuit, to carry more than five times the loading in normal operation.

Once again, because of the teachings of the present invention all these deterring questions will be also eliminated.

This fact, is clearly seen, because in our horizontal-axis disposition; the connecting shaft between the turbine runner and the generator's rotor is very much shorter. Then, the bending moments are reduced and the overall arrangement is much more compact and solid in design and in mechanical endurance.

The mechanical efforts and stresses introduced into the concerned structural bodies-components, are very much reduced at a very much tolerable level.

This advantage is produced again, because of the more compact engineered design which belongs to the horizontal axis, transportable self stabilized hydromotive assembly design.

According to an even further aspect of the present invention, a method is provided for purposes of positioning a self-stabilized transportable hydromotive assembly against the respective open end of the inlet of the dam's water conveying means.

The method comprising the steps of: (a) Taking a self-stabilized hydromotive assembly having a structural body, a water conveying flow means inlet and a water flow means outlet, and a buoyancy engineered means defined in said structural body (b). Displacing the self-stabilized hydromotive assembly slightly upstream of said dam and so oriented that the longitudinal axis of said body, which coincides with the mechanical axis: is substantially parallel to the axis of said dam's water conveying means and positioned substantially thereabove (c). Displacing said self-stabilized hydromotive assembly in a substantially downwardly vertical sinking displacement (d). Directing the sinking self-stabilized hydromotive assembly until it faces the open end inlet of the dam conveying means (e). Displacing the hydromotive assembly to position its water outlet coincidently against the inlet of said dam's water directing means (f). Securing the self-stabilized transportable hydromotive assembly in such working position.

Although references in the specifications are detailed for horizontally positioned turbine-generators sets; it will be obvious that the teachings of the present invention are independent of the specific position of said axis; and that any other specific arrangement is feasible to be considered.

In all these figures, an horizontal axis turbine generator set is engineered; with the generator's rotor diameter being engineered with a numerical magnitude substantially greater than the diameter of the turbine runner. This fact is clearly seen in both FIGS. 1 and 2.

DESCRIPTION OF THE PREFERRED EMBODIMENT

Figure 1:
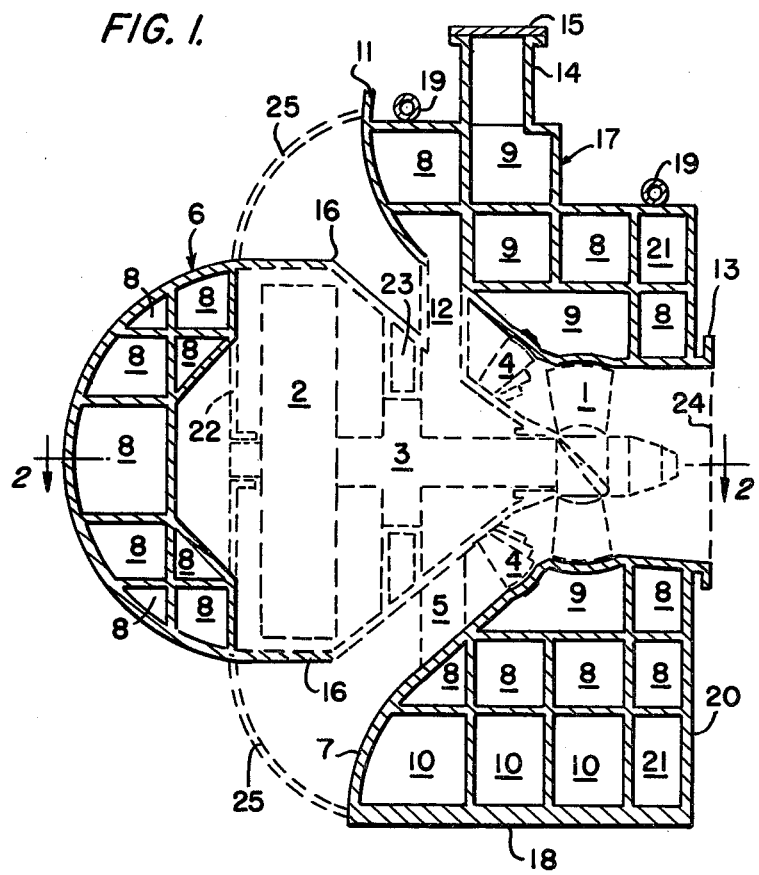
FIG. 1 represents a schematic vertical-longitudinal cross section through a transportable self-stabilized hydromotive assembly arrangement, taken following a plane passing along the main substantially horizontally positioned axis of the capsule mounted generator turbine set; and showing also, related positioned equipment.

In FIG. 1, there is schematically represented a transportable self-stabilized hydromotive assembly being engineered with the basic following components: the turbine runner seen in reference 1; the body of the electric generator 2; the horizontally connecting shaft with their respective thrust bearing, both seen in reference 3; said thrust bearing being engineering to act in both sides by means of a pair of tilting pads sets, and then to be able of taking direct hydraulic thrusts and reversed thrusts; engineered means for producing the actuation on the flow of incoming actuating waters are seen in the movable vane distributor represented in reference 4; the fixed vaned distributor is seen in reference 5; structural body representing the generator's capsule is seen in 6 on the external area of said assembly and in reference 16 on the conduit intake area of the same; actuating water flow is conveyed through the turbine runner, following the annular path limited by walls 16 on the generator's capsule side, and 7 on the structural assembly body side of the water flow directing conduit. Surrounding the wall 7 of said water conduit and enclosed by the wall 6 of said generator's capsule, we find a plurality of buoyancy engineered means being lighter in weight than the surrounding masses of water, and displacing a given volumetric spatial configuration. These buoyancy engineered means have been represented here by a plurality of watertight compartments shown in references 8; which, optionally, can be filled with water for submergence purposes or with air for floatation purposes; the distribution of these buoyancy engineered means is so realized, that they produce an upwardly lifting effect on the structural body of the assembly; very well balanced, and in such a way that the axis position of said turbine generator set is spatially controllably positioned.

Additionally, auxiliary chambers are provided for other duties, like for purposes of machine hall arrangements as are seen in references 9; these auxiliary chambers 9 are service compartments which house a plurality of equipment such as: turbine's governors, compressed air systems, water refrigeration systems, generator's controls, emergency electric power generation sources, switchyard and power transformation components, and the like; as is well known in the art.

Water intake conduits defined by walls 16 and 7, are of substantially annularly-frustum conical configuration in their spatial geometric arrangement. This disposition gives a very short conduit water intake having, here, a longitudinal circulation path of only $2.\phi$ (two times the turbine runner diameter).

Such a short water intake conduit arrangement is not found in actual available technologies, either vertical axis or horizontal axis; and clearly defines the novelty level involved around our new proposed engineered design.

The combination of both, said short water intake conduit arrangement being only $2.\phi$ in longitude, from one side; and the generator's engineered body arrangement being also some: $2.\phi$ in diameter, on the other side; gives the desired level of transient stabilization in the expected dynamic performance of our hydromotive technical design. These are the basic reasons which induces the departure of our engineered proposed design, from any other design realized up until today in the world.

Figure 2:
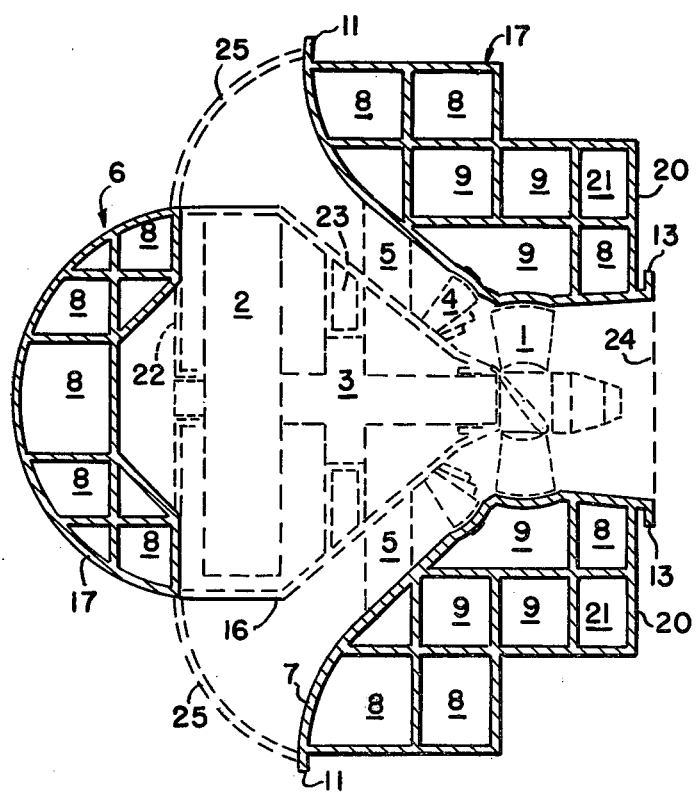
FIG. 2, represents a schematic horizontal-longitudinal cross section through a transportable self-stabilized hydromotive assembly arrangement, taken following a plane passing along the same main substantially horizontally positioned axis of the turbine capsule mounted generator set; taken following the line 2—2. shown in FIG. 1.

Both physical parameters, will be seen in FIGS. 1, 2; and define the true technical novelties introduced into our: Transportable self-stabilized hydromotive assembly concept.

Chambers 10 are used for ballasting purposes, and for stabilizing the hydromotive assembly when floated for navigation purposes. They are also used, for liquid storage such as: lubrication oils, filtered water sources, petroleum products storage, and the like. As said, these buoyancy structural arrangements are designed as bodies-components being of a very reduced specific weight, such as: polystyrene boards, balsa wood panels, and the like, as is well known in the art.

They are so distributed, and engineered around the structure of the self-stabilized hydromotive assembly embodiment; that a very stable and balanced position is produced when said hydromotive assembly is fully or mostly submerged in water.

Returning now to FIGS. 1 and 2; we see that: the structural wall 7 defining the hydraulic conduit which surrounds the turbine runner, is provided with flanges 13 and 11 annularly embodied around the outlet open end 24, and around the inlet open end 25, respectively. Auxiliary means could be bolted at these flanges, such as stop logs in the intake open end 25; or closing removable covers (not shown in figures) at outlet 24, and at inlet 25; which gives an extra watertight compartment for purposes of additional floatation procedures, provided by one new enclosed compartment defined between walls 16 and 7; and between said covers 24 and 25 (not shown in figures).

In this way, an auxiliary buoyancy means is provided, by simply closing said open ends 24 and 25 by means of closing covers (not shown). This arrangement provides an alternate mean for upwardly displacing said stabilized hydromotive assembly; so, partly or fully, replacing the duty performed by the buoyancy means defined by compartments 8, 10, and eventually, 9.

The main structural body 17 of the self-stabilized hydromotive assembly comprises an external wall 20 which is engineered for purposes of being positioned against the face on the upstream side of the main dam's body; and a bottom face 18 which is engineered for purposes of being rested over a concreted supporting structure. Thus, the hydraulic thrust of said hydromotive assembly, when performing in energy generation or in reversed pumping schedule, is passed to the dam's body by positioning said faces 20 against the upstream face of the dam.

And the residual weight of said hydromotive assembly is transmitted to the rocky bottom by means of supporting face 18, when positioned over said concreted slab engineered upstream of said dam's body.

Access means 14, with cover 15, are engineered to enable an operator to approach the machine halls 9 installed within the body 17 of the assembly. Access means 12 permits the servicing of the generator's capsule equipments, and they are enengineered through the fixed vanes of the fixed distribuitor seen in reference 5. Support members 23, and 22, are engineered within said generator's capsule and supports the rotating parts of said generator.

Auxiliary lifting devices are shown in 19, as annular hooks, and permits the cranage of the assembly when positioned against the body of the dam, and in coincidence with the inlets of the respective dam's conveying means, and conduits for water passage.

Jacking arrangements, motorized screwed bolts, and hoisting drums for producing pulling forces; of the said hydromotive assembly body in respect to the body of the dam; are positioned into recesses 21; and provides the necessary pulling or tracting effect to approach said hydromotive assembly to said dam's body, or to remove it from said dam's body.

These are seen in FIGS. 1 and 2.

It is clearly understood that improvements could be introduced in the embodiments previously described, without departing from the scope of the invention specifically defined in the following claims.

I claim:

1. A hydromotive assembly for a fluid storing dam having means for directing a fluidic flow therethrough, said hydromotive assembly including a fluidic flow circulation path defined by a conduit having a lateral wall for directing a fluid flow therethrough, said conduit having a central longitudinal axis extending substantially horizontally, an energy generation unit incorporated within said conduit and actuated by said fluid flow through said conduit, said energy generation unit including a capsule-mounted generator having a motive turbine with a runner, said generator including a rotor having a diameter of a numerical magnitude substantially greater than the diameter of said runner of said motive turbine, said conduit having a first open end and a second open end for discharging said flow entering said first open end, at least one of said open ends adapted to be positioned against at least one end of said dam's fluidic directing means, said hydromotive assembly having defined in its structural body buoyancy means of a volume at least sufficient to induce an upwardly lifting pull of a substantial numerical magnitude when said hydromotive assembly is positioned in submerged status against said dam for purposes of energy generation.

2. A hydromotive assembly for a fluid storing dam as claimed in claim 1 wherein, said electric generator rotor exhibits a moment of inertia of a substantial numerical magnitude designed for purposes of stabilizing the electric flowing pattern introduced within the associated electrical transmission network.

3. A hydromotive assembly for a fluid storing dam as claimed in claim 1 wherein, said hydromotive assembly conduit includes a very restricted longitudinal flow circulation path, between said conduit's intake first open end and said conduit's cross sectional area substantially positioned around and in coincidence with said motive turbine's runner.

4. A hydromotive assembly for a fluid storing dam as claimed in claim 3 wherein, said fluidic conveying conduit includes a substantially annularly frustum-conical geometrical spatial configuration so shaped, that a progressive acceleration and speed increasing is induced into the incoming actuating fluidic masses, when running along the circulation path defined between said conduit's inlet intake first open end, and said conduit's cross sectional area substantially positioned in coincidence with said turbine's runner.

5. A hydromotive assembly for a fluid storing dam as claimed in claim 3 wherein, said fluidic conveying conduit includes a substantially frustum-conical geometrical spatial configuration so shaped, that a progressive decreased speed is produced into the outflowing fluidic masses, when running along the circulation path defined between said conduit's cross sectional area substantially positioned in coincidence with said turbine's runner and the conduit's outlet second open end cross sectional area.

6. A hydromotive assembly for a fluid storing dam having means for directing a fluidic flow through its structural body, said hydromotive assembly comprising a fluid flow circulation path defined by a conduit having a peripheral wall for directing a fluid flow therethrough, said conduit having a central longitudinal axis extending substantially horizontally, a pump-turbine having a runner incorporated within said conduit together with an energy transformation unit including a motor-generator and designed for causing actuation thereof or, alternatively, receiving actuation thereto, said conduit having a first open end and a second open end for discharging said fluid flow entering said first open end when performing in the generation mode, at least one of said open ends being adapted to be positioned against at least one end of said dam fluid flow directing means, said hydromotive assembly having defined in its structural body buoyancy means of a volume at least sufficient to induce an upwardly substantially balanced lifting pull of a substantial numerical magnitude when said hydromotive assembly is being positioned against said dam for purposes of energetic productivity and said motor-generator including a rotor having a diameter of a numerical magnitude substantially greater than the diameter of said runner of said pump-turbine.

7. A hydromotive assembly for a fluid storing dam as claimed in claim 6 wherein, said motor-generator rotor exhibits a moment of inertia of a substantial numerical magnitude designed for purposes of stabilizing the energetic powered input introduced within the associated electrical network when performing in the generation mode.

8. A hydromotive assembly for a fluid storing dam as claimed in claim 6 wherein, said hydromotive assembly fluid flow intake conduit includes a very restricted longitudinal fluid flow circulation path upstreamly of said pump-turbine runner.

9. A hydromotive assembly for a fluid storing dam as claimed in clam 6 wherein, said energy transformation unit includes a capsule-mounted motor-generated combined with said pump-turbine runner, said buoyancy means being defined on said motor-generator capsule and around said conduit peripheral wall to produce said substantially balanced upwardly lifting pull, said first intake open end being substantially annularly configured between said motor-generator capsule and said conduit peripheral wall, and said fluid flow intake conduit having a substantially annular spatial configuration so designed that a progressive speed increase is induced into the incoming motive fluidic flow masses when passing along the fluid flow circulation path defined between said conduit intake first open end and the conduit cross area substantially positioned in coincidence with said pump-turbine runner when said hydromotive assembly is performing in the energy generation mode.

10. A hydromotive assembly for a fluid storing dam as claimed in claim 6 wherein, said energy transformation unit includes a capsule-mounted motor-generator combined with a said pump-turbine runner, said buoyancy means being defined on said motor-generator structural arrangement and within the volumetric spatial configuration defined by said capsule and around said conduit peripheral wall to produce said substantially balanced upwardly lifting pull, said second open end being substantially circularly configured by said conduitperipheral wall, and said fluid flow outlet conduit being engineered having a substantially frustumconical spatial configuration which flares progressively along the fluid flow circulation path defined between said conduit cross area substantially positioned in coincidence with said pump-turbine runner and said conduit outlet second open end.

* * * * *